W. E. HOSCH, DEC'D.
A. M. HOSCH, ADMINISTRATRIX.
FABRIC MEASURING AND COMPUTING MACHINE.
APPLICATION FILED JULY 24, 1916.

1,336,230.

Patented Apr. 6, 1920.
9 SHEETS—SHEET 3.

Inventor
Walter E. Hosch
By [signature], Atty.

W. E. HOSCH, DEC'D.
A. M. HOSCH, ADMINISTRATRIX.
FABRIC MEASURING AND COMPUTING MACHINE.
APPLICATION FILED JULY 24, 1916.

1,336,230.

Patented Apr. 6, 1920.
9 SHEETS—SHEET 4.

Inventor
Walter E. Hosch

By F. K. Cornwall, Atty

W. E. HOSCH, DEC'D.
A. M. HOSCH, ADMINISTRATRIX.
FABRIC MEASURING AND COMPUTING MACHINE.
APPLICATION FILED JULY 24, 1916.

1,336,230.

Patented Apr. 6, 1920.
9 SHEETS—SHEET 8.

Inventor
Walter E. Hosch

W. E. HOSCH, DEC'D.
A. M. HOSCH, ADMINISTRATRIX.
FABRIC MEASURING AND COMPUTING MACHINE.
APPLICATION FILED JULY 24, 1916.

1,336,230.

Patented Apr. 6, 1920.
9 SHEETS—SHEET 9.

Inventor
Walter E. Hosch

UNITED STATES PATENT OFFICE.

WALTER E. HOSCH, OF ST. LOUIS, MISSOURI; ANNIE MAE HOSCH, ADMINISTRATRIX OF SAID WALTER E. HOSCH, DECEASED, ASSIGNOR TO MEASUREGRAPH COMPANY, OF ST. LOUIS, MISSOURI, A CORPORATION.

FABRIC MEASURING AND COMPUTING MACHINE.

1,336,230.      Specification of Letters Patent.      Patented Apr. 6, 1920.

Application filed July 24, 1916. Serial No. 110,963.

*To all whom it may concern:*

Be it known that I, WALTER E. HOSCH, a citizen of the United States, residing at St. Louis, Missouri, have invented a certain new and useful Improvement in Fabric Measuring and Computing Machines, of which the following is a full, clear, and exact description, such as will enable others skilled in the art to which it appertains to make and use the same, reference being had to the accompanying drawings, forming part of this specification.

My invention relates to new and useful improvements in measuring and computing machines and is particularly useful as applied to cloth measuring machines of the type described in my pending applications Serial No. 6,954, filed Feb. 8, 1915, and Serial #17,154, filed March 26, 1915. The measuring machines of this type comprise a rotary member or measuring roller which is rotated by the cloth or goods when passed over it, and movement is imparted to indicating or registering mechanism, to show the length of cloth measured and also the charge to be made for the same at any given selling price per yard. In this type of machine, I have previously provided automatic means for arresting the movement of the measuring roller when the indicating mechanism reaches its registering limit, that is to say, its total indicating capacity. It is also a feature of this type of machine that the registering mechanism is returned automatically to the zero position when its driving mechanism is disconnected from the rotating member or measuring roller.

The general object of the present invention is to provide simple means for controlling the speed of the returning movement of the driving mechanism; I also provide audible means actuated automatically by the mechanism before the indicating mechanism reaches the limit of its capacity, my purpose being to warn the operator of the machine, and suggest to him the necessity for pulling the cloth less vigorously at this time, in order to prevent giving a shock to the mechanism by a too sudden arrest of the driving mechanism and the measuring roller; in constructing this audible signal, one of my objects has been to construct it in such a way that it will not interfere with the returning movement of the driving mechanism when the indicating mechanism is being returned to the zero position.

Further objects of the invention will appear hereinafter.

In the drawing which illustrates a preferred embodiment of my invention,

Figure 1 is a perspective view of a machine of my improved construction, the same being shown in operative position on the edge of a counter or the like.

Figure 1:
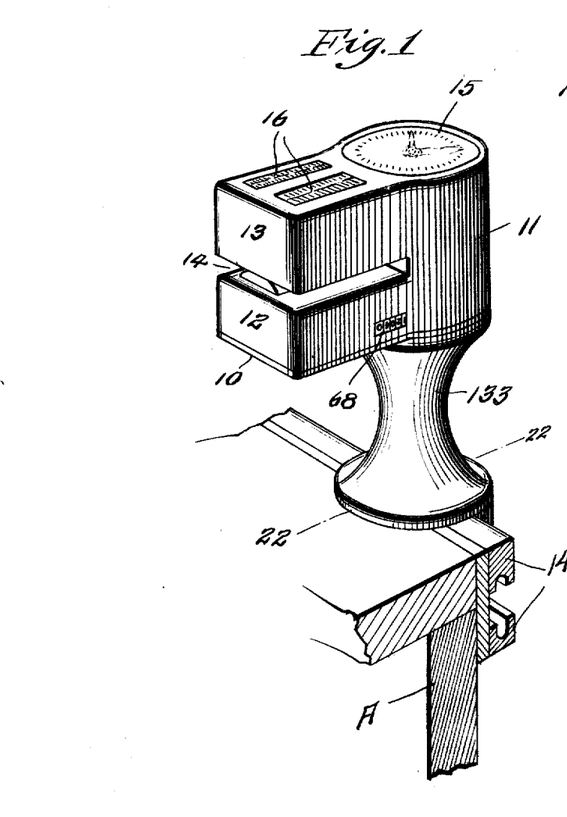
Figure 2:
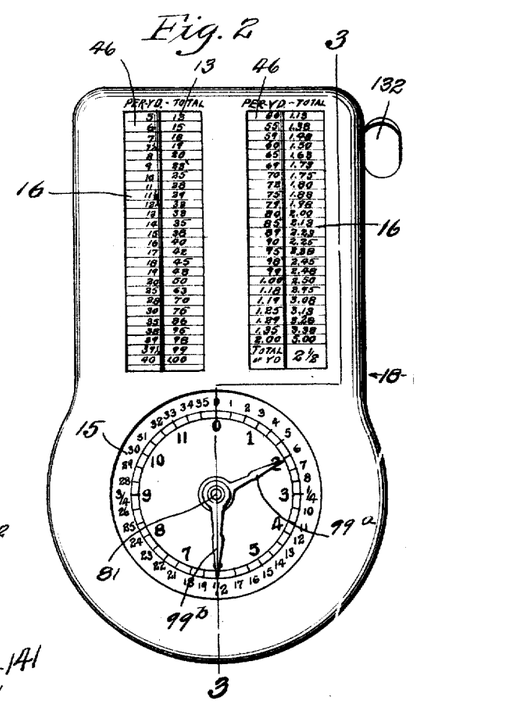
Fig. 2 is a plan view of the machine.

Referring by numerals to the accompanying drawings which illustrate a practical embodiment of my invention, 10 designates a base plate upon which is mounted suitable uprights and brackets, the same serving as supports and bearings for the operating parts of the machine, and mounted upon said base plate is a housing which incloses the operating mechanism. This housing comprises a vertically disposed substantially cylindrical portion 11 which rises from the rear portion of the base plate and projecting forwardly from said housing is a substantially rectangular lower housing 12 and a substantially rectangular upper housing 13. These housings 12 and 13 are spaced apart to provide a horizontally disposed slot or opening 14 through which the goods passes as it is drawn through the machine. The housing thus constructed with the contained operating mechanism as hereinafter described can be placed directly on a counter or show-case and shifted about as desired, or it may be detachably positioned on a short standard which may be mounted for sliding movement on the edge of the counter, as illustrated in Fig. 1.

Where the housing is detached from the standard and used on top of a counter or the like, it is desirable that a section of material such as leather, rubber or felt be applied to the underside of base plate 10 in order to prevent scratching or marring of the counter by the base plate as it is moved thereover.

The top of the housing 11 is provided with a glazed opening 15 through which the dial with its scale, and hands forming a part of the machine, are readily visible, and the top of housing 13 is provided with glazed openings 16 through which the price charts are readily visible.

Fixed to the central portion of base plate 10 is a transversely disposed partition 17 which divides the space within housing 11 from the spaces within the housings 12 and 13, and arranged within housing 11 is a horizontally disposed partition 18 which divides the space within said housing into upper and lower chambers.

Figures 3, 4, 5:
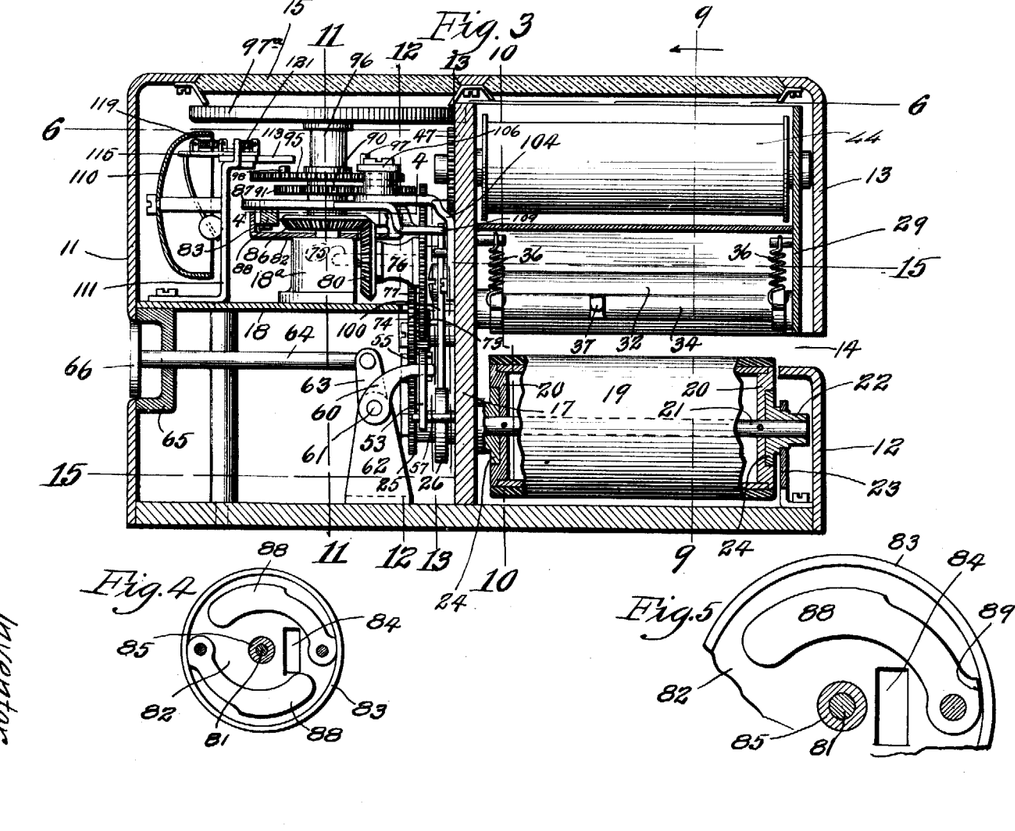
Fig. 3 is an enlarged vertical section taken approximately on the line 3—3 of Fig. 2.
Fig. 4 is a horizontal section taken approximately on the line 4—4 of Fig. 3, and showing the governing device.
Fig. 5 is an enlarged plan view of a portion of the governing device.

Positioned within housing 12 and projecting upwardly through a suitably formed opening in the top of said housing and into the slot or opening 14 is the measuring roller 19 of the device, the same being preferably constructed with a rubber face or periphery, the circumference of which latter is of predetermined length, for instance, four and one-half inches which is one-eighth of a yard, six inches which is one-sixth of a yard, or nine inches which is one-fourth of a yard. The bearings for this measuring roller are constructed so as to prevent dust, fibers or fabric and the like from entering said bearings, and consequently preventing the free and accurate operation of said roller. Heads in the form of plates, Fig. 3 are rigidly fixed in the ends of the roller, said plates being fixed in any suitable manner to an axially disposed shaft 21, the latter being mounted for rotation in bearings 22, the same being rigidly fixed respectively in the partition 17 and in a bracket 23, which latter is located near the outer end of the chamber within housing 12. The inner end of each bearing 22 is provided with a comparatively large disk or collar 24, the same being countersunk snugly in a corresponding recess formed in the outer face of the head or plate 20.

Figure 13:
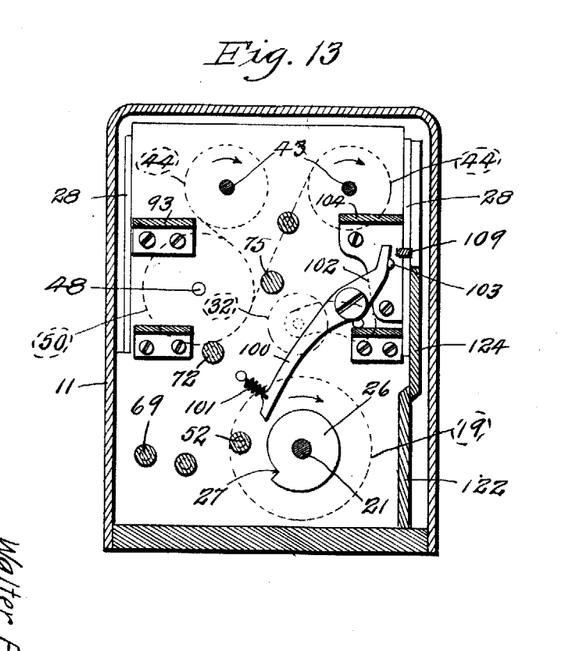
Fig. 13 is a vertical section taken approximately on the line 13—13 of Fig. 3.

One end of the shaft 21 extends into the chamber within housing 11 a substantial distance beyond partition 17 and fixed on said extended end is a pinion 25 and a disk 26, the latter being provided with a shoulder 27, Fig. 13.

Figures 6, 7, 8:
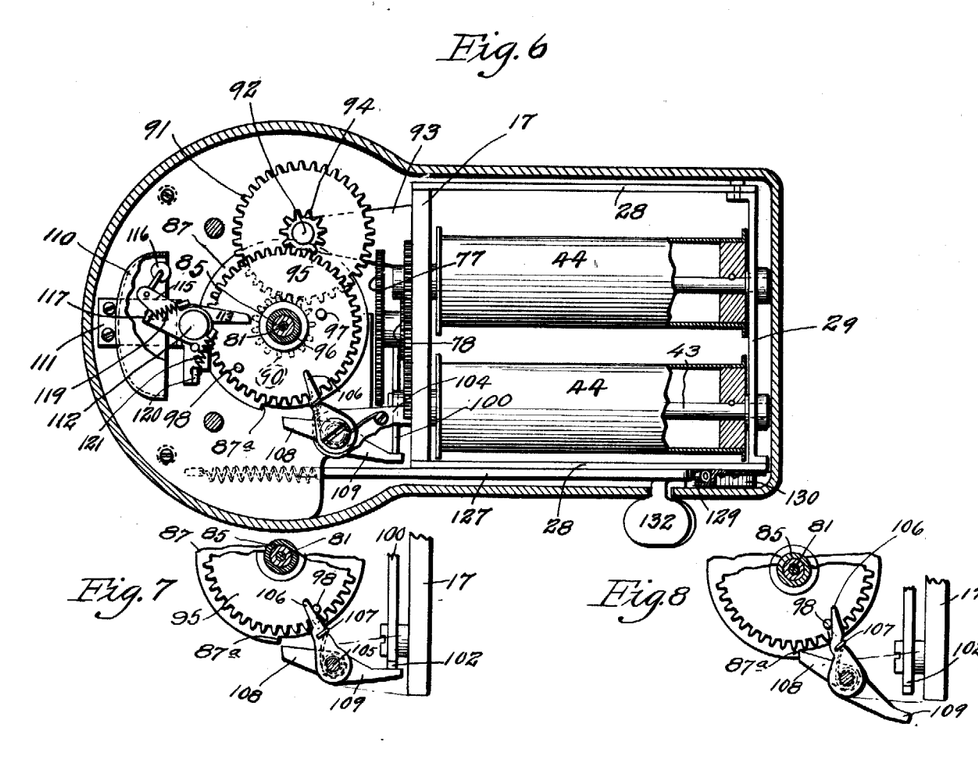
Fig. 6 is a horizontal section taken approximately on the line 6—6 of Fig. 3.
Fig. 7 is a detail plan view of the means employed for limiting the movement of the measuring and indicating mechanism.
Fig. 8 is a plan view similar to Fig. 7 and showing the parts in zero position.
Figure 9:
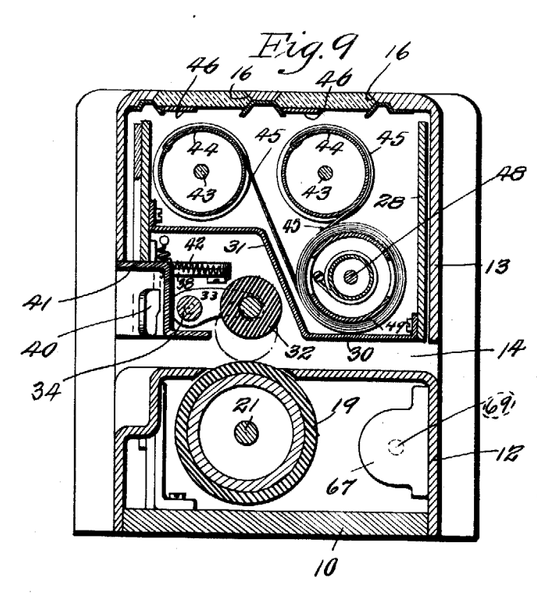
Fig. 9 is a vertical section taken approximately on the line 9—9 of Fig. 3.

Located in the chamber within housing 13 is a framework comprising side plates 28, end plate 29, and bottom plate 30, Figs. 6 and 9, which framework is supported from the upper portion of partition 17. The bottom plate 30 is bent upward as designated by 31 at a point near its middle, thus forming a pocket opening downward which pocket is occupied by a pressure roller 32 which coöperates with the measuring roller 19 during the operation of the machine. This pressure roller 32 is preferably formed of rubber or analogous material and it is carried by a rocking frame, the same comprising arms 33 which project laterally from a shaft 34, the ends thereof being journaled in partition 17 and end plate 29. (See Fig. 16.)

Figure 10:
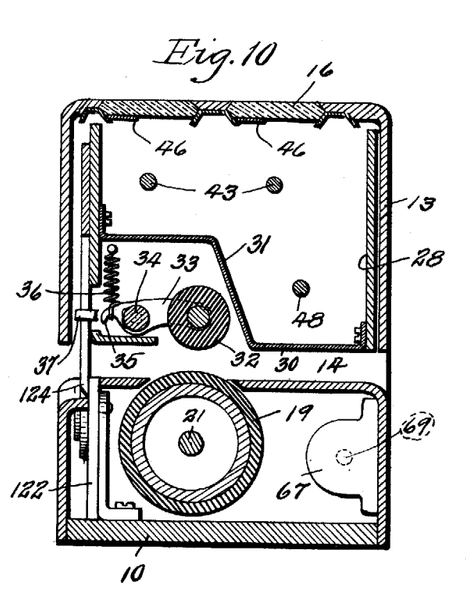
Fig. 10 is a vertical section taken approximately on the line 10—10 of Fig. 3.

The rear ends of arms 33 are provided with hooks 35, Fig. 10, to which are connected the lower ends of retractile springs 36, the tendency of which is to swing the rocking frame carrying pressure roller 32 downward so that the latter engages on top of the fabric being drawn through the machine and presses the same onto the periphery of measuring roller 19.

The ends of the pressure roller are provided with dust and fiber proof bearings which are identical in construction with the bearings at the ends of measuring roller 19, hereinbefore described.

Figure 17:
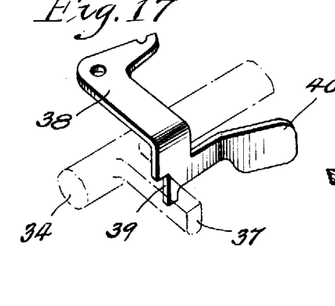
Fig. 17 is a perspective view of the pressure roller releasing lever.

Fixed to and projecting from shaft 34 through an opening in the corresponding side plate 28 is a finger 37, Figs. 3 and 17 and pivotally mounted on a suitably located bracket above this finger is a bell crank 38, the forward end of the long arm of which is bent downward and provided with a notch 39 which is adapted to receive said finger 37. (See Fig. 17.)

Figure 16:
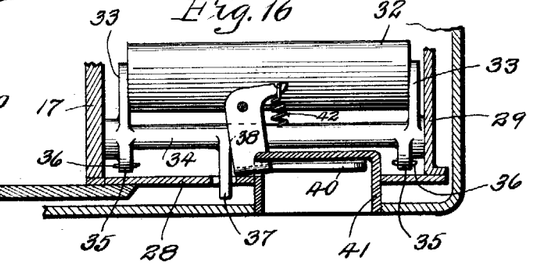
Fig. 16 is a sectional view illustrating parts seen in Fig. 15 and with the pressure roller releasing means in shifted position.

Projecting laterally from the depending end of the long arm of this bell crank is a plate 40, the same occupying a position within a cup 41, Figs. 9 and 16 which latter is positioned in the corresponding side wall of housing 13 immediately above the slot or opening 14.

Connected to the short arm of the bell crank 38 is a retractile spring 42, the same tending to maintain the notched end of the long arm of said bell crank against finger 37.

Journaled in partition 17 and end plate 29 in the upper portion of the chamber within housing 13 are shafts 43, Figs. 6 and 9 and carried thereby are drums 44, the same being positioned directly beneath the glazed openings 16. Fixed to and adapted to wind onto said drums are flexible charts 45, upon the faces of which appear rows of figures which represent the total amounts or prices to be paid for the goods measured in the machine, and the numbers in these rows or columns are spaced so that they will appear directly opposite price per yard figures which are printed on strips 46 of cardboard or the like, said strips being positioned beneath the left hand portions of the glazed openings 16. Two flexible charts and two price per yard strips are utilized in order to materially increase the capacity of the machine, without necessitating the provision of a large housing, which latter would be required to take care of a single long price per yard strip and a comparatively wide single flexible chart. The ends of the shafts 43 which project beyond partition 17 are provided with pinions 47.

Figure 15:
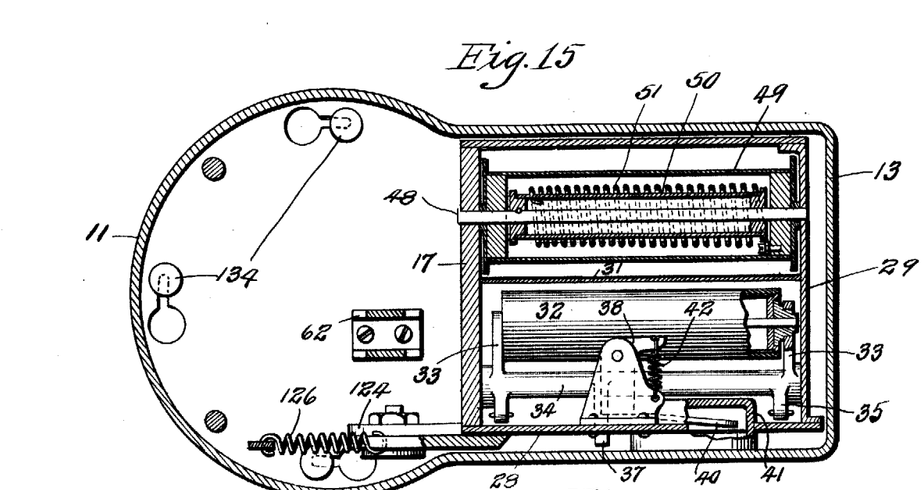
Fig. 15 is a horizontal section taken approximately on the line 15—15 of Fig. 3.

Positioned in the lower portion of the chamber within housing 13 and fixed to partition 17 and end plate 29 is a shaft 48, Figs. 9 and 15, on which is loosely mounted a winding drum 49 which is adapted to receive both the flexible charts 45. This winding drum is hollow and positioned therein and rigidly fixed to shaft 48 is a drum 50 on which is positioned a torsional coil spring 51, one end of which is fixed to said inner drum and the other end being fixed to the outer drum 49.

The driving mechanism for driving the drums and the hands on the dial will now be described. Associated with this mechanism I provide manually operated means for releasing the driving means of the indicating mechanism, from connection to the measuring roller, to permit the spring 50 to rewind the charts on the drum 49. For this purpose projecting outwardly from partition 17 in the chamber below the horizontal partition 18 is a stud 52, Figs. 11 and 12 on which is fulcrumed one end of a curved arm or lever 53, and journaled on said stud is a pinion 54 which meshes with the pinion 25 on shaft 21.

Journaled on a stud which is carried by arm or lever 53 and constantly in mesh with pinion 54 is a pinion 55. The free end of arm or lever 53 is engaged by one end of a retractile spring 56, the opposite end thereof being secured to the partition 18, and the swinging movement of arm or lever 53 is limited by means of a pin 57 which projects outwardly from partition 17 and passes through a slot 58 formed in said arm or lever.

Formed in the arm or lever 53 is a slot 59 in which engages the free end of a curved arm 60, the same being carried by the end of a shaft 61 which is journaled in a suitable bracket or standard 62. (See Fig. 11.) Fixed to this shaft is a short crank arm 63, and pivotally connected thereto is the inner end of a push rod 64, (Figs. 3 and 11) the same extending rearwardly through a cup 65 which is fixed to the rear wall of housing 11 and the outer end of this rod is provided with a disk or head 66. By pushing in this head the arm 53 will move and disengage pinion 55 from gear wheel 74.

Located in the chamber within housing 12 and fixed to one of the side walls thereof is a housing 67, Fig. 9 which contains an ordinary total counting device, preferably of the type employing a series of disks which are adapted to transfer from one to another, as for instance—units to tens, tens to hundreds, and so on, and the edges of these disks are visible through a glazed opening 68 in the side wall of the housing 12. A shaft 69 leads from this counting device through the partition 17 and fixed on the end of said shaft is a pinion 70, Figs. 11 and 12 which meshes with an idle pinion 71, the latter being constantly in mesh with pinion 54.

Seated in partition 17 above stud 52 is a stud 72 upon which is journaled a small pinion 73 rigid with a larger pinion 74, the larger pinion 74 being in position to be engaged by pinion 55, previously described. (See Figs. 11 and 12.)

Positioned on top of the central portion of horizontal partition 18 is a block 18ª in which is journaled one end of a horizontally disposed shaft 75, the other end of which is journaled in partition 17. Fixed on this shaft is a hub 76, Figs. 3 and 11, one end of which carries a comparatively large pinion 77, the same meshing with pinion 73.

Figure 12:
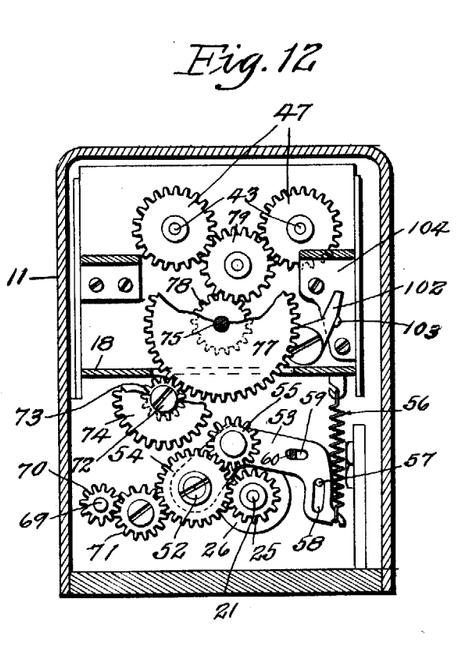
Fig. 12 is a vertical section taken approximately on the line 12—12 of Fig. 3.

Fixed on said shaft 75 adjacent to the pinion 77 is a smaller pinion 78, Fig. 12, the same meshing with an idle pinion 79, which latter meshes with the pinions 47, the same being fixed on the ends of shafts 43 which carry the winding drums 44.

The end of hub 76 opposite the end which carries pinion 77 is provided with a beveled pinion 80.

Figure 11:
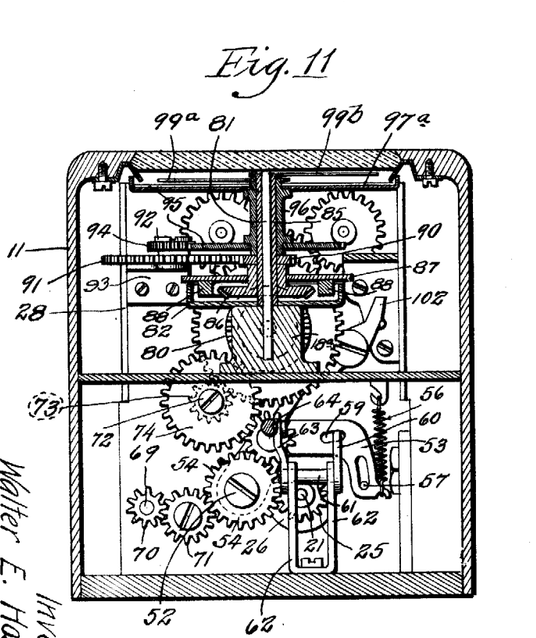
Fig. 11 is a vertical section taken approximately on the line 11—11 of Fig. 3.

Seated in block 18ᵃ is a vertically disposed pin 81 Figs. 3 and 11, the same being disposed coaxially with respect to the glazed opening 15, and fixed on top of said block is a circular plate 82, the edge of which is turned upward to form a flange 83. Formed through this plate 82 is a suitably located opening 84 through which the upper portion of beveled pinion 80 projects.

I provide means for controlling the speed of the indicating mechanism in returning to the zero position. For this purpose loosely mounted on pin 81 is a sleeve or tubular shaft 85, Figs. 4, 6 and 11, and fixed thereon is a beveled pinion 86 which meshes with the beveled pinion 80. Fixed to the hub of pinion 86 is a disk 87 and pivotally mounted on the underside thereof is a pair of horizontally disposed weighted centrifugal governor arms 88, the same being provided near their forward ends with bearing faces 89, Fig. 5, which are adapted to frictionally engage the inner face of flange 83 when the weighted ends of said arms are thrown outwardly by centrifugal force. The edge of this disk 87 is provided with a shoulder 87ᵃ, Fig. 7 to coöperate with means for stopping the indicating mechanism at the zero position in its return movement.

Fixed to sleeve 85 Fig. 11 above the pinion 86 is a pinion 90 which meshes with a controller wheel in the form of a gear 91, the latter being journaled on a stud 92 which is seated in a bracket 93 projecting outwardly from partition 17. Fixed to pinion 91 is a smaller pinion 94, the same meshing with a comparatively large gear wheel 95, the latter being fixed to the lower end of a sleeve 96 which is loosely mounted on sleeve 85.

Seated in and projecting from pinion 95 are pins 97 and 98 Fig. 6, the purpose of which will be hereinafter fully set forth.

The upper portion of sleeve 96 extends through a dial plate 97ᵃ, the same being suitably supported immediately beneath the glazed opening 15, and fixed to the upper end of said sleeve 96 is a hand or pointer 99ᵃ.

Fixed to the upper end of sleeve 85 which latter terminates a slight distance above the upper end of sleeve 96 is a hand or pointer 99ᵇ.

The face of the dial plate bears concentric rows of numerals, the outer one of which is divided into thirty-six equal divisions and being numbered from zero to thirty-five so as to indicate inches. The inner row of numbers run from zero to eleven and are for the purpose of designating yards.

The outer end of the inch measuring hand or pointer 99ᵇ traverses a path immediately above the outer row of inch indicating numerals and the outer end of the yard designating hand or pointer 99ᵃ traverses a path immediately above the inner row of yard designating numerals.

The relative sizes of the various pinions which transmit motion from the measuring roller to the sleeves 85 and 96 carrying the inch and yard indicating pointers are such that the inch indicating hand or pointer 99ᵇ makes a complete revolution over the dial when the hand or pointer 99ᵃ moves the distance between two of the numbers on the inner row, and thus the movement of the hands is in every way similar to the movements of the hands of a clock or watch.

It is desirable that a machine of this character have a definite capacity and to this end I have provided means which will automatically stop the measuring and computing mechanism when a fixed number of yards have been measured.

In practice it has been demonstrated that a machine having a capacity for measuring twelve yards is ample for all practical purposes in retail trade and the machine which I have illustrated and herein described is of the capacity mentioned, namely, twelve yards. Further, it is desirable that an audible signal device be provided which will automatically operate just prior to the time the mechanism has operated to the capacity of the machine, and to this end I have provided an alarm bell, which, together with the automatic stop mechanism will now be described.

Pivotally mounted on a stud which is seated in partition 17 is a pawl 100 Fig. 13, the point of which is adapted to engage against the shoulder 27 on disk 26, and the free end of this pawl is normally held away from disk 26 by a retractile spring 101. The upper end of this pawl is provided with a finger 102 which normally rests against a stop pin 103. Under normal conditions, the pawl 100 occupies the position illustrated in Fig. 13, and when the capacity of the machine has been reached, certain mechanism hereinafter described shifts this pawl into the position illustrated in Fig. 14 with its point against shoulder 27, thus holding the measuring roller 19 against further rotation.

I provide any suitable means for stopping the return movement at the zero position. This may be done automatically as follows:—

Figure 14:
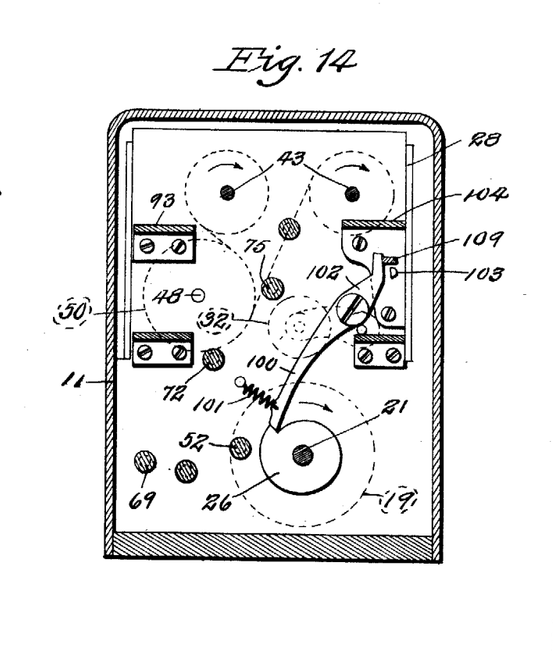
Fig. 14 is a sectional view similar to Fig. 13, and showing certain of the parts in locked position.

Fixed to partition 17 and projecting outwardly therefrom near the upper end of pawl 100 is a bracket 104, Fig. 14, in which is journaled a short vertically disposed shaft 105, Figs. 6 and 7 and fixed to the upper portion of said shaft is a finger 106, Figs. 3 and 7, the outer end of which lies in the path of, and is adapted to be engaged by a dog or pin 98 which is seated in gear wheel 95. (See Figs. 6, 7 and 8.)

Bearing upon this finger is one end of a torsional spring 107, the same tending to throw the free end of said finger away from gear 95.

Fixed on the lower end of shaft 105 Fig. 7, is a detent 108; when the controller wheel 95, in returning, arrives at its zero position the pin 98 engages finger 106 on its left side and rocks detent 108 into the path of shoulder 87ª on disk 87. (See Fig. 8). This stops the indicating mechanism, including the hands or pointers operating over the dial and the flexible charts which wind upon the drum 44, at the zero position.

The rear end of the detent 108 carries a finger 109, the end of which is positioned immediately to the rear of the upper end of finger 102 on pawl or detent 100. (See Figs. 13 and 14.)

The audible signal which serves as an alarm device includes a bell 110 which is mounted on a suitable standard 111, (Figs. 3 and 6) at one side of the mechanism above partition 18; and seated in the upper end of said standard is a pin 112 on which is loosely mounted a trigger 113 provided at one end with an upturned finger 114. (See Figs. 19 to 21).

Figures 19, 20, 21, 22, 23:
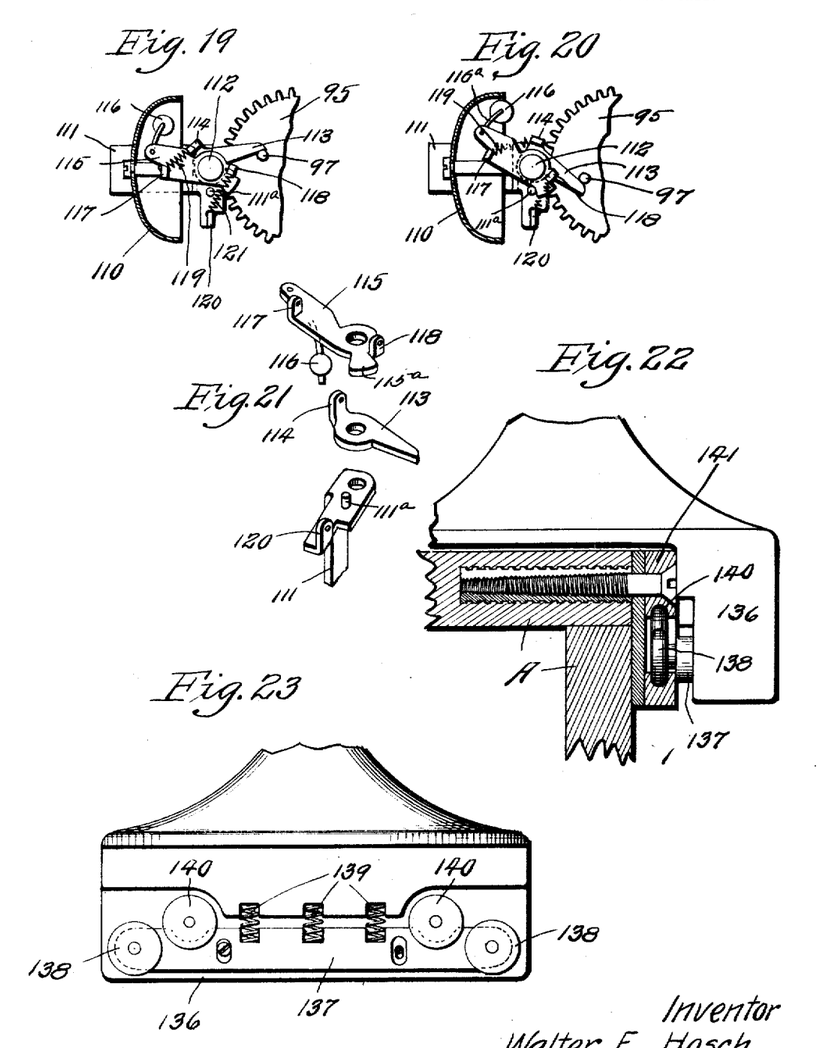
Fig. 19 is a detail sectional view of the alarm bell and mechanism for ringing same.
Fig. 20 is a view similar to Fig. 19 with the parts in shifted positions.
Fig. 21 is a perspective view of the parts utilized for ringing the signal bell.
Fig. 22 is an enlarged sectional view through the edge of the counter taken approximately on the line 22—22 of Fig. 1, and illustrating the lower part of the device in elevation.
Fig. 23 is an elevational view of the lower end of the standard or supporting member which carries the housing of my improved machine.

Loosely mounted on pin 112 above the trigger 113 is a hammer arm 115 carrying at its outer end a hammer 116 which is attached to it by a bent stem 116ª; means is provided for actuating the hammer arm; for this purpose the arm has a lug 118 which is connected by a spring 121 with a lug 120 on the fixed standard or bracket 111. This spring normally holds the hammer 116 against the inner edge of the bell 110. When the machine is approaching the limit of its measuring capacity a dog or pin 97 on wheel 95 (see Fig. 19) strikes the trigger 113. Under these conditions the gear wheel 95 will be rotating in a clock-wise direction, and the dog or pin 97 will engage the trigger as indicated in Fig. 19. The pin 97 will therefore rock the trigger 113 in a counter clock-wise direction and the lug 114, which engages the arm 115 will swing the arm 115 also in a counter clock-wise direction. This will extend spring 121; after pin 97 passes trigger 113 the spring 121 will pull back the hammer arm 115 to its normal position, thereby bringing the hammer 116 against the bell with sufficient force to ring the bell. In order to enable the pin 97 to pass the trigger when the indicating mechanism is being returned to its zero position, I provide means whereby the trigger may move quite independently of the hammer arm and still always be in a position to actuate the arm. For this purpose the lug 114 on the trigger is connected with the lug 117 on the hammer arm by a coil spring 119. Fig. 20 indicates the pin 97 passing the trigger 113 at such a time. From inspection of this figure it is evident that this pin simply rocks the trigger 113 in a clock-wise direction. This extends spring 119 which permits the trigger to swing sufficiently to let the pin 97 pass it.

In order to enable the parts just described to maintain their proper relation if the bell 110 should be detached, the hammer arm 115 is provided with a tail 115ª which is pulled by the spring 121 substantially up against a fixed stop in the form of a pin 111ª on the bracket 111. The pin 97 is located a sufficiently short distance from the axis of the gear wheel 95 to enable it to pass without engaging the pawl 106 with which it is not intended to coöperate. The pin 98 already described is made short so that it will pass without engaging the trigger 113 with which it is not intended to coöperate. See Fig. 3.

Figure 18:
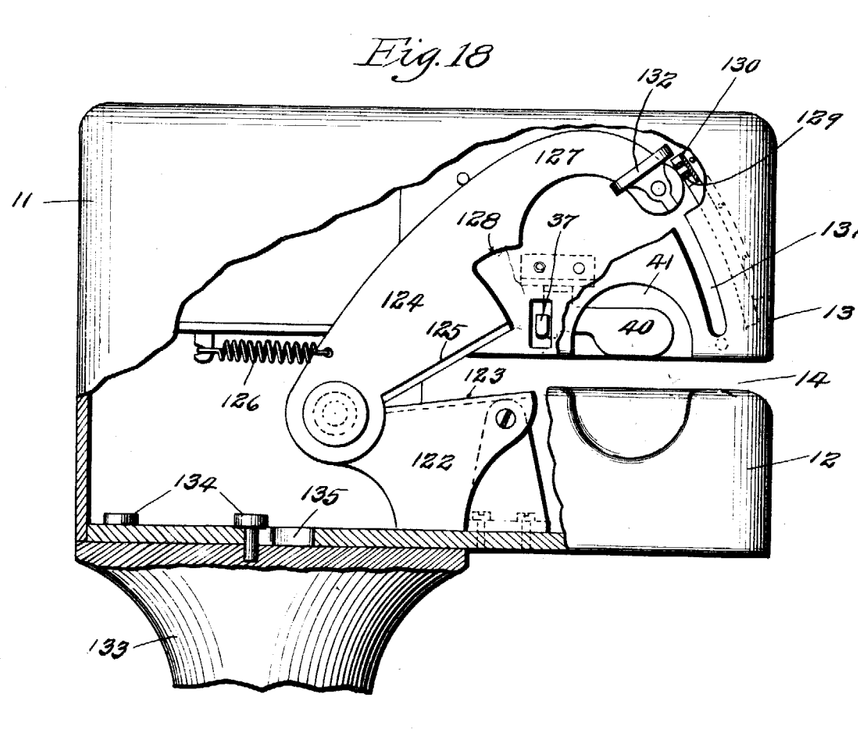
Fig. 18 is an elevational view of the housing of the machine looking in the direction indicated by the arrow 18, Fig. 2, and showing a portion of the housing broken away to illustrate more clearly the goods marking device.

The means utilized for marking the edge of the goods at the completion of the measuring operations to serve as a guide for the salesman in severing the measured goods, is illustrated in Fig. 18, and will now be described.

Fixed within housing 12 and immediately adjacent to the right hand wall thereof and to the rear of cup 41 is a vertically disposed plate 122, the same being provided on top with a cutting edge 123. Hinged to the rear portion of this plate is a blade 124 provided with a sharpened cutting edge 125 which is adapted to coöperate with cutting edge 123, said plate being normally held elevated by a retractile spring 126. The plates 122 and 124 are located so that their cutting edges occupy positions above and below the rear portion of slot or opening 14.

Formed integral with and projecting forwardly from plate 124 is a curved arm 127, the same being provided on its underside with a shoulder 128 which is adapted to engage the outer end of finger 37 which is carried by shaft 34. (See Figs. 16 and 18.)

The forward end of arm 127 is provided with an anti-friction roller 129 which operates in a channel-shaped guide 130, the same being fixed to the right hand wall of housing 13. Formed through this last mentioned wall is a curved slot 131, the same being concentric with the axis of plate 124, and fixed to the forward end of arm 127 and projecting through this slot is a plate 132.

It will be understood that my improved machine as herein described can be positioned on a counter or table, thereby permitting it to be readily shifted from one position to another as may be required for use or it may be rigidly fixed in any suitable manner at a convenient point on the counter.

In the event that it is desired to mount the machine for sliding movement on the edge of a counter a suitable base is provided, which base is preferably in the form of a standard 133 (see Fig. 1), the top of which engages that portion of the plate 10 which forms the bottom of the housing 11. Seated in the top of the standard are headed studs 134 which are adapted to engage through key-hole openings 135 formed in the base plate (see Fig. 15). Such construction permits the machine to be easily and quickly applied to or removed from the base or standard.

Formed integral with or fixed to the bottom of the base or standard is a depending block 136 (Fig. 22), upon which is mounted for limited vertical movement, preferably by means of pin and slot connections, a bar or shoe 137, the ends of which carry small wheels or rollers 138.

Compression springs 139 are interposed between a portion of the block 136 and the top of bar or shoe 137, thus yieldingly holding said rail and its wheels against vertical movement. Journaled on the block 136 and positioned adjacent to wheels or rollers 138 are wheels or rollers 140.

Fixed to the edge of a counter or table A on which it is desired to mount the standard and machine are rails 141 Fig. 1, the same being grooved to receive the peripheries of wheels 138 and 140. (See Figs. 22 and 23.)

By virtue of the construction just described, the standard carrying my improved machine is adapted to be readily shifted to any desired position along the edge of the counter or table with which said machine is associated.

The operation of my improved machine is as follows:

It will be understood that under normal conditions, the machine stands with the hands or pointers 99ª and 99ᵇ at zero positions upon the dial 97, said parts being so positioned and held by the engagement of pin 98 against finger 106, and by the engagement of the point of detent 108 against shoulder 87ª, as illustrated in Fig. 8.

Under normal conditions, there is very little tension in spring 51 Fig. 15, and both flexible charts 45 are wound onto drum 49 Fig. 9; when so positioned, blank spaces appear on the faces of said charts immediately beneath the right hand edges of the price per yard strips 46. Pressure roller 32 is normally maintained in elevated position as illustrated in Figs. 9 and 10, by the engagement of finger 37 in notch 39. (See Fig. 17.)

The operator or person measuring the goods stands immediately behind the machine or to the rear of the housing 11 with the goods on the counter to the left of the machine. The extreme end of the piece of goods is now engaged by the thumb and finger of the right hand of the operator, while the left hand grasps the edge of the goods eight or ten inches from the right hand. That portion of the goods between the hands is now inserted into the slot or opening 14 and both hands are moved toward the left or until the thumb of the operator's right hand engages plate 40 in cup 41, Figs. 9 and 16. As this plate is moved inward, bell crank 38 is swung upon its pivot, thereby releasing finger 37, Fig. 17, and shaft 34 will now be rocked under the tension of springs 36 with the result that pressure roller 32 moves downward until it engages with pressure on the top surface of the goods passing over measuring roller 19. The operator now pulls the goods through the machine with his right hand and with his left hand manipulates and guides the edge of the goods from the bottom toward the slot or opening 14 in the machine, and this action necessarily imparts rotary movement to the measuring roller 19 by reason of the friction of the goods against said roller due to the pressure of roller 32 and with each complete rotation of said roller, an amount of goods corresponding to the length of the circumference of said roller passes through the machine and is registered by the operating mechanism therein.

The salesman keeps account of the amount of goods drawn through the machine by noting the position of the hands traversing the dial on plate 97 and when said hands register on the dial the amount of goods desired by the purchaser, the drawing-through operation is terminated.

As measuring roller 19 is operated, the rotary motion thereof is transmitted from pinion 25 to pinion 54, Fig. 12, from thence through pinions 55, 74 and 73 to the large pinion 77 and from thence through pinions 78 and 79 to pinions 47, which are fixed on the ends of shafts 43, which carry the winding drums 44. As drums 44 are thus rotated, the flexible charts 45 will be wound thereupon, and as said charts unwind from drum 49, Figs. 9 and 15, the coil spring 51 will be torsionally wound upon drum or cylinder 50, thereby storing power in said spring. As this unwinding and rewinding operation of the charts takes place, the columns of figures on the faces of said charts appear in succession beneath the right hand edges of the price per yard on strips 46, and at the completion of the measuring operation, the salesman notes the figure in the column on the chart which is directly opposite the price at which the goods is to be sold, and thereby ascertains the total amount to be charged for the measured piece of goods.

It will be understood that the various operating parts of the machine are of such size as to operate in proper ratio to the movement of measuring roller 19, the circumference of which, as heretofore stated, is of definite length.

During the measuring operations, the rotary motion of shaft 75 which carries the large pinion 77 is transmitted by beveled pinions 80 and 86, Figs. 3 and 11, to sleeve 85 carrying the inch indicating pointer 99 and rotary motion from said sleeve is transmitted by pinion 90 to pinion 91 and from thence through pinions 94 and 95 to sleeve 96, which latter carries the yard indicating pointer 99ᵃ. Thus both hands or pointers are simultaneously driven over the dial during the measuring operation, and by virtue of the relative sizes of the driving pinions associated therewith, the inch indicating hand 99ᵇ makes a complete revolution while the yard indicating hand moves the distance between two of the yard indicating numerals on the dial.

The rotary motion of the measuring roller is transmitted through pinions 25, 54, 71 and 70, Fig. 11, to shaft 69, which latter is directly connected to the counting mechanism within housing 67, Fig. 10, and thus said counting mechanism is operated to register the total number of yards measured in the machine.

When the measuring operation has been completed, the salesman engages plate 132 Fig. 18 and moves the same downward, thereby moving shear plate 124 downward, and the edge of said last mentioned plate coöperating with edge 123 on fixed plate 122 makes a short cut in the edge of the goods, and this cut serves as a guide for the salesman in severing the measured piece of goods from the bolt. As this operation takes place, shoulder 128 on arm 127 bears against the outer end of finger 37, thereby moving said finger downward and rocking shaft 34 Figs. 3 and 10, with the result that pressure roller 32 is elevated against the tension of springs 36 and when finger 37 has been moved downward a certain distance, spring 42 Fig. 9 will act to swing bell crank 38 on its pivot, thereby positioning the outer end of said bell crank so that the finger 37 Fig. 17 is engaged in notch 39, with the result that pressure roller 32 is temporarily locked in its elevated position. This frees the goods from the machine and the salesman now severs the measured piece of goods from the bolt thereof, using the marking cut in the edge of the goods as a guide. To restore the hands or pointers to zero position upon the dial, and to rewind the flexible charts 45 onto drum 49, the operator pushes rod 64 Fig. 3, inward by bearing on disk or head 66, which action rocks shaft 61, and the end of curved arm 60 swings arm 53 downward against the tension of spring 56, with the result that pinion 55 is moved away and disengaged from pinion 74. (See Fig. 12.) As soon as this disengagement of the pinions takes place and while rod 64 and associated parts are held in their shifted positions, the power stored in coil spring 51 will act to rewind the flexible charts onto drum 49, thus bringing said charts to zero position, with respect to the price per yard strips 46.

When the charts have reached their zero positions, the pressure on disk 66 should be relieved, thereby permitting arm 53 to return to its normal position with pinion 55 in engagement with pinion 74.

It will be understood that the gearing carried in and associated with arm 53 acts as a brake to prevent the return of the charts to the drums 44 as long as pinion 55 is in mesh with pinion 74.

To regulate the speed at which the charts rewind from the rollers 44, I have provided the weighted governor arms 88 Fig. 4 which are carried by disk 87, and as said disk rotates during the rewinding movement, the weighted ends of the arms 88 are thrown outward by centrifugal force, thereby causing the bearing faces 89 to frictionally engage the inner face of flange 83, consequently preventing the gearing and the charts from "racing" during the return of said charts to zero position.

At the beginning of measuring operations and with the parts in zero positions, pin 98 bears against finger 106 as illustrated in Fig. 8, and the point of detent 108 bears against shoulder 87ᵃ.

When the machine is started in operation, pin 98 will move away from finger 106 in a clockwise direction, see Fig. 8.

In the event that the machine is operated to its capacity during a single measuring operation, the alarm bell 110 will be sounded by the engagement of pin 97 Figs. 6 and 19, with the end of trigger 113, which action causes finger 114 to bear against one edge of plate 115, thereby swinging said plate on stud 112 and storing power in spring 121. Immediately after pin 97 passes the end of trigger 113, said trigger and plate 115 will be restored to their normal positions, with the result that hammer 116 will contact with the bell 110, thereby sounding an alarm. It will be understood that this alarm is sounded shortly before the capacity of the machine is reached. On the return movement of pinion 95, pin 97 will ride past the end of trigger 113, and spring 119 will restore said trigger to its normal position.

To automatically stop the machine after twelve yards have been measured, pin 98, after having made a complete revolution with gear 95, strikes against finger 106 as illustrated in Fig. 7, thus rocking shaft 105 and moving the end of finger 109 into engagement with the upper end of finger 102, Fig. 14, carried by pawl 100, with the result that the point of said pawl 100 is moved into the path of travel of shoulder 27 and at the completion of the measuring of twelve yards of goods, the parts just described will occupy the positions illustrated in Fig. 14, thus preventing further rotation of the measuring roller 19, the shaft of which carries disk 26. When pinion 95 returns to its normal position, pin 98 will bear against finger 106, as illustrated in Fig. 8, consequently moving the point of detent 108 into the path of travel of shoulder 87ª, and when said shoulder engages said detent, the hands or pointers and the charts are in their normal or zero positions, and thus set for a succeeding measuring operation. As finger 109 moves away from finger 102, spring 101 will act to return pawl 100 to its normal position, as seen in Fig. 13.

In the event that it is desired to measure a piece of goods which has a length greater than the capacity of the machine, said goods can be run through the machine until twelve yards have been registered, whereupon the operator presses inward on disk 66, which action results in a disengagement of pinions 55 and 74, Fig. 12, and the charts and pointers will now return to zero positions without disturbing the goods positioned between the measuring roller 19 and pressure roller 32. This operation can be repeated until the total yardage in a piece of bolt goods is ascertained.

A cloth measuring machine of my improved construction is comparatively simple, is very compact, can be readily shifted from one point of use to another, can be arranged to slide on the edge of a counter or table, is effective in saving much of the time and labor usually involved in measuring and computing the cost of piece goods, is automatic in its computing operations, eliminates the cutting off of short and overlength pieces of goods by salesmen, and eliminates mistakes in the calculation of the total cost of odd lengths of goods at a price per yard which runs into fractions.

It will be readily understood that minor changes in the size, form and construction of the various parts of my improved machine can be made and substituted for those herein shown and described, without departing from the spirit of my invention, the scope of which is set forth in the appended claims.

I claim:

1. In a machine of the class described, the combination with a rotary member adapted to be actuated by the movement thereover of the goods being measured, of a dial, an index hand movable over said dial, means for effecting a movement of the hand corresponding to the movement of the rotary member, a pair of stationary price scales, a pair of charts coöperating respectively with said price scales, which charts bear rows of figures indicating price totals of yards of goods and fractional parts thereof arranged thereon to coöperate with said price scales, a single drum on which both of the charts are normally wound, means for imparting simultaneous and corresponding movement to said charts, which movement corresponds to the movements of the rotary member and the index hand, spring operated means for restoring the index hands and charts to zero positions, manually operated means to release said spring operated means, and means for controlling the speed of movement of the index hands and charts in restoring the same to zero positions.

2. In a machine of the class described, a rotary member adapted to be actuated by the goods passed through the machine, a pressure roller adapted to engage the goods and press the same against the rotary member, a pair of drums mounted for rotary movement in the machine, flexible charts connected to said drums so as to be windable onto and from said drums, a single drum arranged adjacent to the pair of drums, said flexible charts being connected to said single drum and adapted to wind thereon, means actuated by the rotary member for simultaneously imparting corresponding rotary movements to said pair of drums, fixed price scales arranged adjacent to the exposed faces of the flexible charts, spring operated means for imparting rotary movement to the single drum to rewind the charts thereupon, manually operated means for releasing said spring operated means, and means for regulating the speed of the rewinding movement.

3. In a machine of the class described, a rotary member adapted to be actuated by the goods being measured, means operated by said rotary member for registering the movement thereof, a pair of price scales adjacent to said rotary member, a pair of drums adjacent to said price scales, means actuated by the rotary member for simultaneously operating said drums, charts connected to said drums so as to be windable onto and from said drums, a third drum on which the charts are normally wound, a spring coöperating with said third drum for rotating the same to rewind the charts thereon, which spring is wound by the unwinding of the charts from said third drum, and manually operated means for releasing said spring to effect the rewinding operation, and means for controlling the speed of the rewinding movement.

4. In a machine of the class described, a rotary member adapted to be actuated by the goods passing through the machine, means operated by said rotary member for registering the movement thereof, a pair of price scales adjacent to said rotary member, a pair of drums adjacent to said price scales, means actuated by the rotary member for simultaneously operating said drums, flexible charts windable by the operation of the machine onto said drums, a third drum on which the charts are normally wound, a spring coöperating with said third drum for rotating the same to rewind the charts thereon, which spring is wound by the unwinding of the charts from the third drum, manually operated means for releasing said third drum to effect a rewinding operation, coöperating driving connections from the rotary member to the driving means for the pair of chart carrying drums, and means driven by said coöperating driving connections for regulating the speed thereof during the rewinding movement.

5. In a machine of the class described, a measuring roller having a definite circumference, a pressure roller coöperating therewith, means including a pair of flexible charts adapted to unwind from a single drum onto a pair of drums and a pair of stationary price scales coöperating with the flexible charts for calculating the price of the goods drawn over the measuring roller, driving connections from the measuring roller to the pair of drums on which the charts are adapted to wind, and means for limiting the number of revolutions of the measuring roller.

6. In a cloth measuring machine, the combination of a rotary member adapted to be actuated by the goods when passed thereover, indicating mechanism for indicating the length of goods measured, a wheel driven so as to rotate when said indicating mechanism is driven, a bell, a hammer arm having a hammer for striking said bell, a trigger engaging said arm to swing the same back, a dog on said wheel for moving said trigger, a spring attached to said arm for pulling the same forward to strike the bell after the trigger is released by said dog, means associated with said indicating mechanism for returning the same to the zero position and thereby rotating said wheel in a backward direction, and means associated with said trigger to permit the same to be moved independently of said arm, by said dog, when said dog moves backwardly, while the indicating mechanism is returning to zero.

7. In a cloth measuring machine, the combination of a rotary member adapted to be actuated by the goods when passed thereover, indicating mechanism for indicating the length of goods measured, driving mechanism driven by said rotating member for driving the indicating mechanism and including a wheel mounted to rotate when said indicating mechanism is driven, an audible signal including a hammer arm for giving the signal, a trigger engaging said arm to swing said hammer, said wheel having a dog for moving said trigger, a spring attached to said arm for pulling the same forward to sound the alarm after the trigger is released by said dog, means for returning said indicating mechanism to the zero position and thereby rotate said wheel in a backward direction, and a spring associated with said trigger to enable the same to be moved independently of said arm by said dog when said dog moves backwardly, while the indicating mechanism is returning to zero.

8. In a cloth measuring machine, the combination of a rotary member adapted to be actuated by the goods when passed thereover, indicating mechanism for indicating the length of goods measured, a wheel driven so as to rotate when said indicating mechanism is driven, a dog on said wheel, means actuated by said dog for arresting the movement of the said rotary member at the limit of movement of the indicating mechanism, a second dog on said wheel, and an audible signal actuated by said second dog before the indicating mechanism reaches the limit of the indicating movement.

9. In a cloth measuring machine, the combination of a measuring roller adapted to be actuated by the goods when passed thereover, indicating mechanism, gearing therefor driven by said roller, a stop device for stopping the roller actuated by said gearing when the indicating mechanism reaches the limit of its indicating movement, manually operable means for disconnecting the indicating mechanism from said measuring roller to permit the same to be returned to its zero position, means for returning the indicating mechanism to its zero position, means for controlling the speed of the return movement of the indicating mechanism, and means for stopping the indicating mechanism at its zero position.

10. In a cloth measuring machine, the combination of a measuring roller adapted to be actuated by the goods when passed thereover, spring controlled indicating mechanism driven by said measuring roller against the resistance of its spring, manual means operable at will to permit the return of the indicating mechanism by its spring to the zero position after the measuring operation, and means for controlling the speed of the return movement of the indicating mechanism.

11. In a cloth measuring machine, the combination of a rotary member adapted to be actuated by the goods when passed thereover, indicating mechanism driven by said rotary member, manually operable means for disconnecting the indicating mechanism from the rotary member, means for returning the indicating mechanism to zero, means for stopping the indicating mechanism at the zero position, and means for controlling the speed of the return movement.

12. In a cloth measuring machine, the combination of a rotary member adapted to be actuated by the goods when passed thereover, indicating mechanism, gearing therefor driven by said rotary member, manually operable means for disconnecting the indicating mechanism from said gearing to permit a return movement of the indicating mechanism to the zero position, means for returning the indicating mechanism to zero, means for stopping the indicating mechanism at the zero position, and a friction device actuated by said returning means for resisting the returning movement.

13. In a cloth measuring machine, the combination of a rotary member adapted to be actuated by the goods when passed thereover, indicating mechanism, gearing therefor driven by said rotary member, means for disconnecting the indicating mechanism from said gearing to permit a return movement of the indicating mechanism to the zero position, means for returning the indicating mechanism to zero, means for stopping the indicating mechanism at the zero position, and a centrifugal friction brake device actuated by said returning means for regulating the speed of the return movement.

14. In a cloth measuring machine, the combination of a rotary member adapted to be actuated by the goods when passed thereover, indicating mechanism driven by said rotary member, a controller wheel mounted to rotate with the indicating mechanism, a lever pivotally mounted on a fixed part of the machine and adapted to engage said rotary member to arrest the same, means for normally holding said lever out of engagement with said rotary member, a finger having means rigidly connected therewith for engaging said lever to move the same into engagement with said rotary member, said controller wheel having means for actuating said finger.

15. In a cloth measuring machine, the combination of a rotary member adapted to be actuated by the goods when passed thereover, indicating mechanism, gearing therefor driven by said rotary member, a controller wheel mounted to rotate with the indicating mechanism, a lever pivotally mounted on a fixed part of the machine and adapted to engage said rotary member to arrest the same, means for normally holding said lever out of engagement with said rotary member, a finger having means rigidly connected therewith for engaging said lever to move the same into engagement with said rotary member, said controller wheel having means for actuating said finger, means for disconnecting the indicating mechanism from said gearing to permit the return movement of the indicating mechanism to the zero position and means actuated by said finger for stopping the indicating mechanism in its return movement at the zero position.

16. In a cloth measuring machine, the combination of a rotary member adapted to be actuated by the goods when passed thereover, indicating mechanism driven by said rotary member, a controller wheel mounted to rotate with the indicating mechanism, a lever pivotally mounted on a fixed part of the machine and adapted to engage said rotary member to arrest the same, means for normally holding said lever out of engagement with said rotary member, a finger having means rigidly connected therewith for engaging said lever to move the same into engagement with said rotary member, said controller wheel having a shoulder thereon, a detent rigid with said finger, a spring for normally holding said finger in a position to maintain said detent out of the path of said shoulder, means for disconnecting the indicating mechanism from said rotary member to permit the indicating mechanism to return to its zero position, means for returning the indicating mechanism to its zero position, a dog mounted on said controller wheel in a position to engage one side of said finger at the limit of the indicating movement of the said indicating mechanism to rock said lever and stop said rotary member, said dog also operating to engage the other side of said finger when the indicating mechanism has substantially returned to its zero position to rock said detent into the path of said shoulder and thereby stop the return movement of the indicating mechanism in the zero position.

In testimony whereof I hereunto affix my signature, in the presence of two witnesses, this 10th day of July, 1916.

WALTER E. HOSCH.

Witnesses:
M. P. SMITH,
M. A. HANDEL.